April 1, 1969   F. J. SUTTON   3,435,970
BOAT LOADING AND UNLOADING APPARATUS FOR A VEHICLE
Filed July 27, 1967

INVENTOR.
FLOYD J. SUTTON though the winch cable means to the end of the boat

United States Patent Office 3,435,970
Patented Apr. 1, 1969

3,435,970
BOAT LOADING AND UNLOADING APPARATUS FOR A VEHICLE
Floyd J. Sutton, Long Beach, Calif.
(Walker Rte., Coleville, Calif. 96107)
Filed July 27, 1967, Ser. No. 656,535
Int. Cl. B60r 9/00
U.S. Cl. 214—450       11 Claims

ABSTRACT OF THE DISCLOSURE

The specification discloses boat loading and unloading apparatus for a vehicle comprising roller means for the top of the vehicle for rollably supporting an inverted boat, winch means mounted at one end (opposite from an unloading end) of the vehicle and having a free end provided with coupling means for attachment to one end of the boat, controllably mountable and dismountable upwardly extending boom means having a pulley wheel for supporting an intermediate portion of the winch cable during a boat loading and unloading operation and positioned at the opposite unloading end of the vehicle, effective horizontal hinge means for attachment to a lower portion of the unloading end of the vehicle and having coupling means for attachment with respect to one end portion of a boat prior to the beginning of a boat-weight-lifting retraction or boat-weight-lowering extension movement of the winch cable; and restraining and travel limiting longitudinal cable means having one end attached to one end of the boat and the other end attached to a fixed upper attachment location at the unloading end of the vehicle top for limiting the lowermost position of the boat inner pivot end attained adjacent to the loading and unloading end of the vehicle to a predetermined minimum elevation above an underlying ground level.

---

Generally speaking, the apparatus includes a plurality of laterally spaced roller means adapted to be carried by a vehicle top with the axes of the rollers horizontally transversely directed so as to be capable of receiving the longitudinal side edge portions of an inverted boat thereon in a manner which will not only support the inverted boat but which will allow it to be longitudinally rolled aong the roller means from one end (usually a rear end) of the vehicle toward an opposite end (usually a front end), and vice versa. This makes it possible to easily roll the inverted boat from a position substantially directly superimposed over the top of the vehicle into a position longitudinally extended beyond one end of the vehicle (usually the rear end of the vehicle) to a degree such that the boat is just about to become overbalanced by reason of the unsupported projecting part of the length thereof extending beyond (usually rearwardly beyond) the corresponding end of the vehicle top. This is the second operation in unloading a boat, as will be described hereinafter.

Conversely, the horizontally transversely axially directed vehicle top roller means will allow the inverted boat, when in said longitudinally extreme projecting position (usually a rearwardly extreme and rearwardly projecting position), as described above, to be manually rolled forwardly into a position substantially directly superimposed over the vehicle top. This is the next-to-the-last operation in loading a boat, as will be described hereinafter.

The apparatus also includes controllably operable and controllably lockable winch means provided with a longitudinal winch cable means having a free end controllably extendable and retractable thereby and adapted to be controllably connected to an end of the boat (usually a front end) when the boat is standing in a slightly inclined erect position immediately adjacent to one end (usually a rear end) of the vehicle top at an intermediate point or step in the sequence of steps involved in either a loading operation or an unloading operation so that the winch may be operated in a retraction manner for applying tension during loading operation for inclining or tipping it further forwardly until it reaches said previously described horizontal rearwardly projecting inverted position partially overlying the top of the vehicle for subsequent rolling movement along said previously described roller means into a substantially directly superimposed position over the top of the vehicle.

Also, said winch cable means may be employed in an opposite manner during an unloading operation by operating the winch means in an extension manner so that the boat, when standing in the previously mentioned slightly inclined erect position at one end (usually the rear end) of the vehicle can be caused to swing outwardly and downwardly until the boat reaches a horizontal and non-inverted position adjacent to and extending outwardly from said end of the vehicle (usually adjacent to and extending rearwardly from the rear end of the vehicle) for positioning on either an adjacent ground surface, water surface, or wheeled boat transporter or trailer.

The apparatus also includes a controllably mountable and dismountable upwardly extending boom means provided with rollable pulley sheave or wheel means at the top thereof positioned for pivoting movement around a transversely, horizontally directed axis and adapted to receive an intermediate portion of said winch cable means thereover during that portion of a boat loading or unloading operation described in the preceding paragraph—that is, that portion between the slightly inclined erect position of the boat standing on end adjacent to one end (usually the rear end) of the vehicle and the other completely unloaded position where the boat is substantially horizontally oriented and in a non-inverted position suitable for placing on a ground surface, a water surface, or a wheeled underlying transporter or trailer, and for removal from such a support (ground, water, or boat transporter) during an upward swinging boat loading operation toward said erect inclined upstanding position of the boat adjacent to one end (usually the rear end) of the vehicle. At other times, the boom means is normally removed.

The apparatus also includes restraining and travel-limiting cable means provided with attachment means for attaching one end of same to an inverted end (usually a rear end) of a boat and with means for attaching an opposite end of said cable means with respect to a fixed upper attachment means at one end (usually a rear end) of the vehicle top during that portion of a boat loading or boat unloading operation between the previously mentioned inverted horizontal, rearwardly extending position and the slightly inclined erect position standing up adjacent to one end (usually the rear end) of the vehicle, so that an effective substantially central location along the longitudinal side edges of the inverted boat will effectively comprise a pivot point of the boat between said positions without any substantial rearward and downward sliding or longitudinal movement of the inverted boat's longitudinal side edges occurring with respect to a rear pair of said previously mentioned horizontally transversely axially directed roller means during the pivotal movement of the boat between said two positions of the boat just referred to.

The apparatus also includes effective horizontal hinge means including first and second effective hinge means portions hingedly interconnected and provided with attachment means for controllably removably and firmly attaching said first effective hinge portion in a horizontal transversely directed position immediately adjacent to and slightly longitudinally displaced from a lower part of one end (usually rearwardly displaced from a lower portion of a rear end) of the vehicle which, in many cases, comprises a rear frame or bumper portion of the vehicle, and provided with attachment coupling means for removably attaching said second effective hinge portion with respect to one end of the boat when in said inclined erect position standing up substantially adjacent to one end (usually the rear end) of the vehicle.

It will be understood that the effective horizontal hinge means will allow the end of the boat (usually the rear end) hingedly connected thereby with respect to the corresponding end (usually the rear end) of the vehicle to pivotally move the entire boat under the control of the winch cable and winch means previously mentioned between said inclined erect upstanding position and a horizontally extending non-inverted position and vice versa, usually in the absence of said flexible restraining and travel-limiting cable means.

In other words, during a boat unloading operation, after completion of the downward movement from the longitudinally extreme projecting position previously mentioned into the inclined upstanding erect position previously mentioned during which the flexible restraining and travel-limiting cable is connected as previously described, the effective horizontal hinge means is connected and the restraining and travel-limiting means is disconnected and the completion of the boat loading operation is effected.

The reverse sequence of steps prevails during a boat loading operation when the effective hinge means is in operative mounted connected relationship but the flexible restraining and travel-limiting cable means is not operatively connected. However, as soon as the boat reaches the previously mentioned inclined erect position, standing adjacent to one end (usually the rear end) of the vehicle, and is ready to be pivoted into the previously mentioned extended, inverted, horizontal position partially overlying the top of the vehicle, the restraining and travel-limiting cable means is operatively connected for effective pivot-point-control purposes during this intermediate step in the sequence of a boat loading operation, and the effective hinge means is disconnected, removed, and stored away in the camper until it is needed during the next boat-unloading operation.

In one form of the invention, the winch means can be controlled from a location at the loading and unloading end of the vehicle, which makes it possible for one person to perform the entire sequence of steps involved in a boat unloading operation and a boat loading operation with an absolute minimum of effort being required.

In another form of the invention, the winch means may be controlled or operated from the end of the vehicle opposite to that where the boat loading and unloading operation occurs, and in this form of the invention it will only be necessary for an operator to walk back and forth between opposite ends of the vehicle a very few times to effect a boat unloading operation and a boat loading operation, again with an absolute minimum of manual strength and effort being required on the part of the operator.

Thus, it will be understood that an elderly person who is perhaps slightly physically incapacitated or perhaps is a semi-invalid can easily operate the boat loading and unloading apparatus of the present invention by himself and can easily load and unload a relatively heavy boat of approximately the order of 400 lbs. weight which, in the absence of the apparatus, would normally require the efforts of several strong men to load and unload.

I am aware of the fact that various other boat loading and unloading devices and apparatuses have been developed in the past for the same general purposes as the apparatus of the present invention. However, the best of such apparatuses known to me will not handle a boat of more than approximately 200 to 250 lbs. and is of a more complicated nature and is more difficult to operate.

With the above points in mind, it is an object of the present invention to provide novel boat loading and unloading apparatus having any or all of the advantages referred to herein and including any or all of the features referred to herein, generically and/or specifically, and individually or in combination and which is of relatively simple, inexpensive, easily mountable and dismountable construction capable of storage in a relatively small space volume and, therefore, capable of easy portability and which is suitable for manufacture and mounting as original equipment on a vehicle, such as a pick-up truck, camper or the like, or is suitable for manufacture and sale as an auxiliary kit for relatively simple mounting and installation with respect to a pre-existing vehicle or camper at any time after the original manufacture and sale of the vehicle or camper. The construction is so simple as to require a minimum of tooling and, therefore, of capital costs and is also adapted for prdouction at an extremely low cost per unit such as to facilitate large scale manufacturing, sale and use of the invention for the purposes outlined herein.

Further objects are implicit in the detailed description which follows hereinafter (which is to be construed as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, one primary embodiment of the invention, and one slight modification thereof are illustrated in the hereinbelow-described figures of the accompanying drawings and are described in detail hereinafter.

FIG. 11 is a fragmentary, top plan view of a representative vehicle top such as the top of a camper carried by a pick-up truck, for example, although not specifically so limited, and illustrates one form of mounting of the plurality of pairs of laterally spaced, horizontally transversely axially directed roller means for rollable engagement with longitudinal side edges of the inverted boat and also shows in top plan view a centrally positioned longitudinal track means adapted to rollably, supportingly and guidingly receive a centrally positioned roller, or rotatably mounted track follower means, positioned on the top surface of the boat which will be downwardly directed when the boat is inverted over the top of the vehicle and which will, thus, effectively support and guide the boat during longitudinal rollable movement of the inverted boat along the vehicle top, either forwardly or rearwardly.

In the exemplary first form of the invention illustrated, the boat is adapted to be mounted in inverted position over the top of a vehicle of a particular type which is often referred to as a "camper," which is generally designated by the reference numeral 20, and which may be said to include the pick-up truck, generally designated by the reference numeral 22, provided with the camper body portion, generally designated by the reference numeral 24, which has the camper top 26 which will be referred to hereinafter as the vehicle top. Indeed, hereinafter, for purposes of simplicity, the entire camper 20 comprising both the pick-up truck 22 and the camper body 24 will be referred to as the vehicle or motor vehicle. However, it should be clearly understood that the boat loading and unloading apparatus of the present invention may be employed in association with various other types of vehicles having various other types of vehicle tops, and the description which follows should be broadly construed in the light of this statement.

Also, it should be noted that, in the exemplary form of the invention illustrated, the winch means generally designated by the reference numeral 28, is carried by a front end of the vehicle 20, and the boat loading and unloading operation occurs primarily adjacent to the rear end, generally designated at 30, of the vehicle 20 and/or of the vehicle top 26. However, while this is a preferred arrangement, it should be understood that it is not to be construed as limiting the invention thereto. It is possible for the invention to have the winch mounted at the rear of the vehicle and to unload the boat primarily at the forward or front end of the vehicle. This is particularly true if the vehicle is of the "van" or "bus" type wherein the front end is very similar in shape to the rear end and the entire body may be said to be of substantially parallelepiped shape. Therefore, the description which follows hereinafter, wherein reference is made at various times to the front end and/or the rear end, and various adjectives and/or adverbs based upon the word roots "front" and/or "rear" are to be broadly construed in the light of the foregoing statement.

Figure 2:
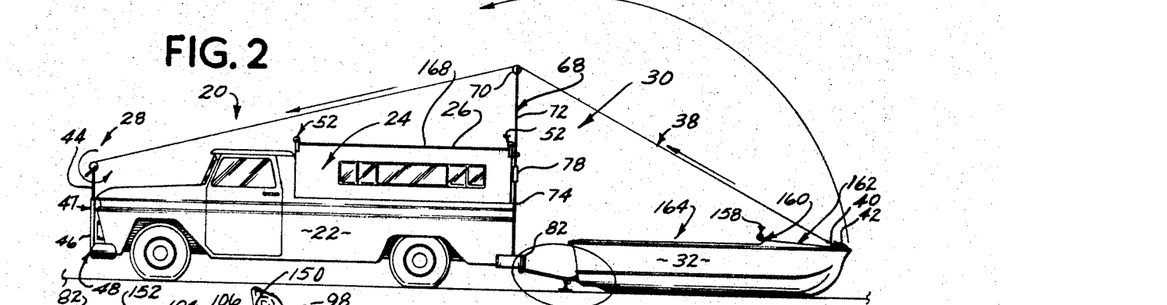
FIG. 2 is a smaller scale, side elevational view as seen from the left side of FIG. 1 showing the apparatus in engagement with a boat at the beginning of a boat loading operation.
Figure 3:
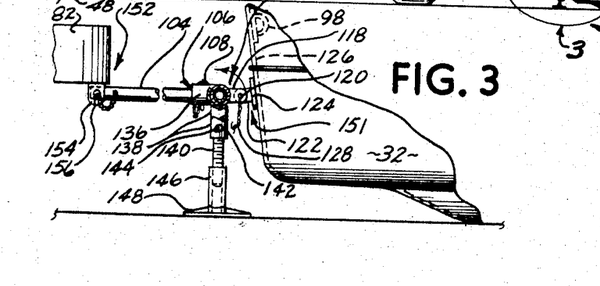
FIG. 3 is an enlarged, fragmentary, side elevational view, partly broken away, and shows that portion of FIG. 2 lying within the enclosed portion designated by the arrow 3.
Figures 4, 8:
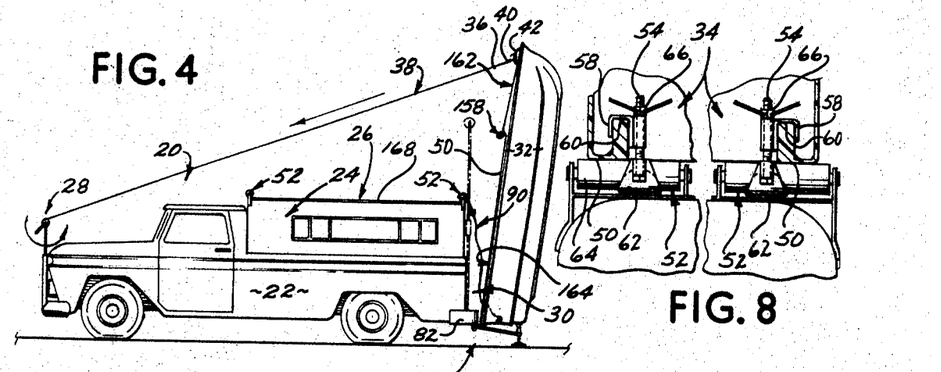
FIG. 4 is a side elevational view similar to FIG. 2 but illustrates a next step in the sequence of steps involved in a boat loading operation.
FIG. 8 is an enlarged, fragmentary, partly-broken-away view, partly in elevation and partly in section, taken substantially along the plane and in the direction indicated by the arrows 8—8 of FIG. 7 and illustrates the representative two rear clamp means of the four similar clamp means usually employed, which act to clamp the longitudinal side edges of the inverted boat, when in the fully loaded position shown in FIG. 7, to the four rollers fastened to the top of the camper.
Figures 6, 6A, 7:
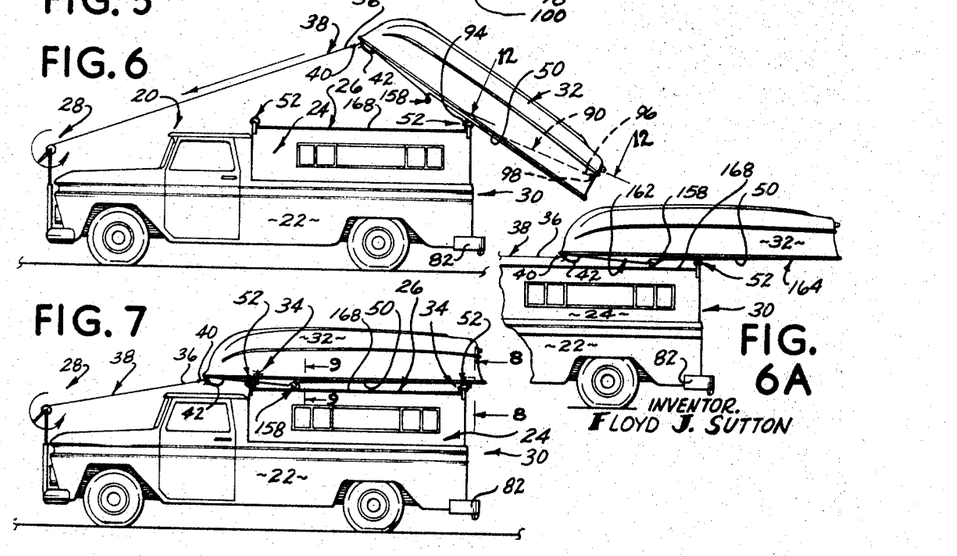
FIG. 6 is another side elevational view illustrating the step following that illustrated in FIG. 5 of the plurality of steps involved in a boat loading operation.
FIG. 6A is a fragmentary view similar to FIG. 6 but shows a slightly displaced position of the boat wherein it is substantially horizontally oriented rather than somewhat inclined as shown in FIG. 6, and this is the position of the boat immediately preceding that of FIG. 6 during a boat-unloading operation and immediately following that of FIG. 6 during a boat-loading operation.
FIG. 7 illustrates the final step in the achievement of a final position of a boat loading operation.

In the exemplary form of the invention illustrated, a boat of a rather substantial size and weight is shown and is generally designated by the reference numeral 32 and is to be loaded from an unloaded position generally similar to that shown in FIG. 2 into an inverted, superimposed, mounted or loaded position substantially overlying the top 26 of the vehicle, or of the camper body portion 24 thereof, in a position substantially identical to that shown in FIG. 7 and is then adapted to be firmly clamped in said loaded position by appropriate clamp means, such as the two generally designated by the reference numeral 34 in FIG. 8 where a representative pair of said clamps are best shown, and such as also generally designated at 34 in FIG. 7 where the detailed structure of said clamps is not shown to best advantage but the location of the mountings thereof are clearly indicated. Normally there will also be two or more similar forward clamps at the forward or front locations indicated at 34 in FIG. 7 to fasten the front end of the inverted boat firmly to the top 26 of the vehicle 20.

When the boat 32 is firmly clamped down in the inverted, fully loaded position shown in FIG. 7, the free end 36 of a winch cable, indicated generally at 38, may have the coupling hook 40 disengaged from a fastening bracket or eye member 42 mounted at the front end of the boat 32 and said free end 36 of the cable 38 may be completely wound up on the winch means indicated generally at 28.

On the other hand, if desired, the free end 36 of the winch cable 38 may be left in the position shown in FIG. 7. This is usually not considered desirable because it is possible that a traffic officer might consider the extended portion of the winch cable 38 to comprise a driving hazard to some minor extent since it is positioned in front of the eyes of a driver of the vehicle 20. Thus, normally when the assembled structure comprising the vehicle 20 and the fully loaded and clamped boat 32, is to be driven from one location to another, the extended portion of the winch cable 38 usually has the hook 40 at the free end 36 thereof disengaged from the boat-mounted fastening bracket 42 and is fully wound up on the winch means 28 which then normally has the upper slidably telescopically mounted vertical shaft portion 44 thereof removed from the lower receiving mounting portino 46 thereof (both of which may be said to effectively comprise winch attachment and mounting means, generally designated at 47, for firmly mounting the winch means 28 in the upwardly extending relationship shown at the front end of the vehicle 20 for the boat loading and unloading purposes described hereinafter). Said winch attachment and mounting means 47 is rigidly fastened at the location indicated at 48 to the front end of the bumper or frame of the pick-up truck 22.

Then the entire upper removed portion of the winch means 28 and the wound-up winch cable 38 is normally placed in some convenient storage location, such as within the rear of the camper body 24 until it is needed later on for a boat unloading operation.

Figure 10:
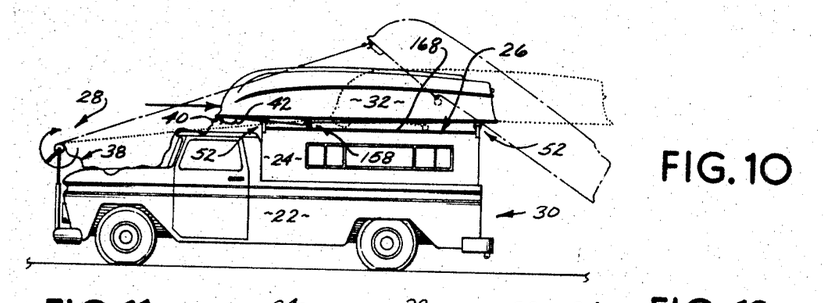
FIG. 10 is a view similar to FIG. 7 and shows the boat in solid lines in the same position as shown in FIG. 7 but illustrates by the rightwardly directed arrow the first step in a boat unloading operation until the boat passes through the intermediate, rearwardly extreme but still horizontal position shown in dotted lines and subsequently moves into and achieves the phantom line position corresponding to that of FIG. 6 achieved during a loading operation.

Incidentally, it should be noted that the winch means 28 is of a controllably lockable and unlockable type capable of being unlocked to allow it to be rotated in either a counterclockwise direction as viewed in FIGS. 2 through 7, which might be termed a winch cable retraction direction, or to be rotated in the opposite or clockwise direction such as shown in FIG. 10, which might be termed a winch cable extension direction, and to be controllably locked at any desired location during either type of winch cable rotating operation. The detailed structure of the controllably lockable and unlockable winch means 28 is not shown since such winch means are well known in the art and it should merely suffice to say that the winch means 28 may be of any of such well known types which are controllably lockable and unlockable at desired extension and/or retraction positions in any suitable manner.

When the inverted boat 32 is in the fully loaded, mounted, stored position shown in FIG. 7 (except that the winch cable 38 has not been fully retracted and the upper portion of the winch means 28 has not been removed in the manner described above for storage in the camper body 24 until it is needed for a subsequent boat unloading operation), the longitudinal side edges 50 of the inverted boat 32 (which are normally the top side edges thereof but which, of course, are at the bottom when the boat is so inverted) rest upon the two longitudinally spaced pairs of roller means generally designated at 52, with one pair of said roller means 52 being laterally spacedly mounted at front side edge portions of the vehicle top 26 (actually the top of the camper body 24) and with the two rear roller means 52 being similarly laterally spaced and mounted at rear side edge portions of the vehicle top 26 (actually the top of the camper body 24). It will be noted that the two rollers of the front pair of roller means 52 are laterally spaced as mentioned above and are horizontally transversely axially directed and aligned with each other and that the two rear roller means of the rear pair of roller means 52 are laterally spaced as mentioned above and are horizontally transversely axially directed and aligned with each other. Thus, the four rollers 52 of the two pairs of rollers are positioned exactly right for receiving engagement or underlying rollable abutment with the inverted longitudinal side edges 50 of the boat 32 when in its fully inverted, loaded position shown in FIG. 7 and will firmly support the inverted boat 32 in said position.

The previously mentioned clamp means 34, in a preferred form of the invention, act to clamp the boat longitudinal side edges 50 to the four rollers of the roller means 52 in the manner shown in greatest detail in FIG. 8 which will be understood as being representative of all of said clamping structures and will, thus, firmly lock the boat in the inverted, stored, loaded position shown in FIG. 7 and will prevent any movement of the boat 32 so that the pick-up truck 22 can be driven from one location to another without any possibility of the boat 32 becoming dislodged from its firmly mounted, top-positioned, inverted location.

In the example illustrated, each of said clamp means 34 comprises an exteriorly threaded shaft portion 54 normally upwardly directed and vertically slidably carrying a sleeve portion which has an inverted U-shaped engagement hook portion 58 attached thereto and adapted to engage the corresponding upwardly directed terminus 60 of each of the previously mentioned longitudinal boat side edges 50, as is best shown in FIG. 8. The lower end of the previously mentioned threaded shaft portion 54 is provided with another arcuate engagement hook portion 62 which is adapted to encircle the compressible elastomeric or rubber outer roller sleeve 64 of the corresponding roller means 52. An interiorly threaded wing nut 66 is threadedly engaged on the upper exteriorly threaded end 54 of the clamp 34, thus making it possible to threadedly downwardly advance the wing nut and move the two engagement hook portions 58 and 62 toward each other for firmly clamping the boat longitudinal side edge 50 to the roller means 52, or making it possible to threadedly retract the wing nut 66 upwardly so as to move the two engagement hook portions 58 and 62 away from each other whereby to allow them to be disengaged from the corresponding longitudinal boat side edge 50 and the roller means 52 and to be completely removed therefrom when the boat 32 is to be subsequently unloaded.

At such time, each of the four clamps 34 will normally be so disengaged and will allow the inverted boat 32 to be manually moved rearwardly by rolling the longitudinal inverted boat side edges 50 along the corresponding roller means 52 until a rearwardly extreme but still substantially horizontal intermediate position is reached such as is shown in dotted lines in FIG. 10. Either at this point or at an immediately succeeding point in a boat unloading operation shown as is shown in phantom lines in FIG. 10 when a boat has pivoted around the pivot or fulcrum point provided by the rear pair of roller means 52 into the extreme position permitted by the extended winch cable end 38, which has been previously connected thereto by having the hook 40 hooked to the boat fastening bracket 42 after the remounting of the upper portion of the winch means 28 in the lower portion 46 thereof. This is the first step in a boat unloading operation and the remaining sequence of steps will be described subsequently. The important point to note is that when each of the four clamp means 34 is disengaged and removed, the inverted boat 32 is free to be slidably rollably moved rearwardly for a boat unloading operation or is free to be moved forwardly from a position such as is shown in phantom in FIG. 6 into the final fully loaded position shown in FIG. 7. This may be done either manually by rolling the boat 32 forwardly along the roller means 52 or may be accomplished by winding up the extended portion of the winch cable 38 by operation of the winch means 28 in the retraction direction clearly shown in FIGS. 6 and 7.

The foregoing brief description does not comprise a full boat loading operation in the same sense that the preceding brief description of rearward rollable movement of the boat, as illustrated in FIG. 10, does not comprise a complete boat unloading operation. The complete sequence of steps involved in both types of operation will be apparent from the subsequent description set forth hereinafter and the only reason that such partial boat unloading and boat loading operations have been referred to hereinbefore is to clarify the purpose and function of the roller means 52 and the immobilization function of the clamp means 34 with respect to the boat 32 and the roller means 52 when the boat is in the inverted, fully loaded and stored position shown in FIG. 7.

The invention also includes a readily mountable and dismountable, effectively collapsible, and upwardly extendable boom means such as is generally designated by the reference numeral 68, which is adapted to be mounted immediately behind and closely adjacent to the rear end 30 of the vehicle 20, and, indeed, substantially vertically aligned with said rear end 30 and extending upwardly from said top 26 in a manner which might almost be said to be a centrally positioned, upward extension of said rear end 30 of the vehicle 20.

Figures 5, 9:
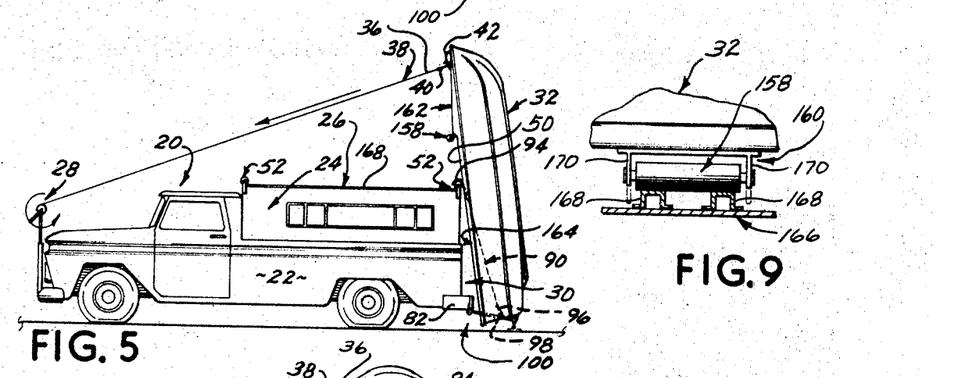
FIG. 5 is another side elevational view similar to FIGS. 2 and 4 but illustrates the step in a boat loading operation following that shown in FIG. 4.
FIG. 9 is an enlarged fragmentary view partly in section and partly in elevation taken substantially along the plane and in the direction indicated by the arrows 9—9 of FIG. 7 and illustrates a representative one of the plurality of pairs of laterally spaced, horizontally transversely axially directed roller means mounted longitudinally along side portions of a vehicle top for allowing slidable movement of the inverted boat's longitudinal side edges therealong during either a boat loading operation or a boat unloading operation.

The boom means 68 mounts a rollable pulley sheave or wheel means 70 at the top thereof which functions for providing an upper positioning and force-applying point for the cable 38 during those portions of a boat-loading operation between the position of the boat 32 shown in FIG. 2 and the position of the boat 32 before it reaches the position shown in FIG. 4. By the time the boat 32 reaches the FIG. 4 position and thereafter during a boat loading operation as shown in FIGS. 5, 6, and 6A, the subsequent sequence of steps illustrated in FIGS. 5, 6, 6A, and 7 do not require the boom means 68. Therefore, normally, after the boat reaches the pre-FIG. 4 position referred to above, or when it reaches the position shown in FIG. 4 during a boat loading operation, the boom means 68 is removed so that it will not interfere with the remainder of the boat loading operation illustrated in the figures referred to immediately above.

Also, it should be noted that the boom means 68 is not needed during a boat unloading operation until the boat 32 is moved from the FIG. 7 position, or the solid-line position thereof shown in FIG. 10, through the dotted-line position shown in FIG. 10, and the phantom-line position shown in FIG. 10, and into the next subsequent boat unloading position similar to that shown in FIG. 5, followed by movement into the FIG. 4 position. At that time the boom means 68 may be remounted so that the apparatus will essentially be in the relationship shown in FIG. 4 except that the boom means will be shown in solid lines subsequently as the boat is lowered by operating the winch means 28 in the clockwise extension direction shown in FIG. 10 from the FIG. 4 position of the apparatus. It will eventually reach a position identical to the pre-FIG. 4 position referred to above where the winch cable 38 can be guided into engagement with the upper pulley sheave 70 at the top of the boom means 68 which thereafter will supply support to the front end of the boat 32 as it swings downwardly through the remainder of the unloading arc into the fully unloaded position shown in FIG. 2.

The boom means 68 may be made removable and effectively extendable and collapsible in a variety of ways. In the example illustrated, this is accomplished by providing the boom means 68 in two boom sections, a lower boom section 72 and an upper boom section 74 which are adapted to be effectively vertically alignedly coupled and pinned together by a fastening bracket or sleeve structure 76 which is laterally apertured and provided with locking pin means 78 adapted to be placed therethrough for locking the two boom sections 72 and 74 in vertically aligned, effectively extended relationship such as shown in FIG. 2 and as shown partially broken away in FIG. 1.

The lower end of the lower boom section 72 is adapted to be received in a mounting hole 80 provided in the rear bumper portion 82 of the vehicle 20, thus rigidly mounting and fastening the bottom of the boom means 68. An intermediate portion of the boom means is adapted to be fastened by a fastening sleeve 84 and pin means 86 mounted on a top-positioned rear upper portion 88 of the camper body 24, thus providing for rigid, firm mounting of the complete boom means 68 and yet doing so in a manner which allows it to be easily disassembled and removed. When so removed, the disassembled boom means 68 can be stored within the camper body 24 until it is again needed. The above-mentioned mounting hole 80 in the bumper 82 and the fastening sleeve 84 and pin 86 may be said to effectively comprise boom attachment and mounting means for firmly mounting the boom 68 in the upwardly extending relationship best shown in FIGS. 1 and 2.

Figure 1:
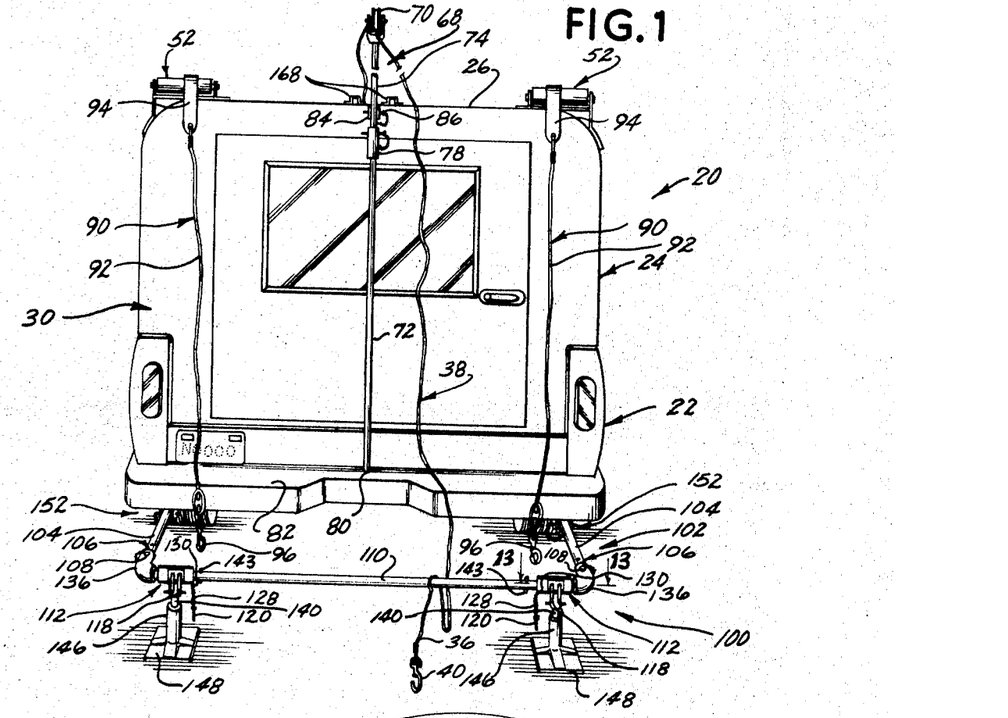
FIG. 1 is a rear elevational view of one exemplary embodiment of the present invention with the boom means partly broken away and effectively shortened thereby for drawing space-saving reasons and shows the apparatus in substantially the proper relationship for engagement with the rear end of a boat in horizontal non-inverted ground-level position (not shown) for the beginning of a boat loading operation.
Figure 12:
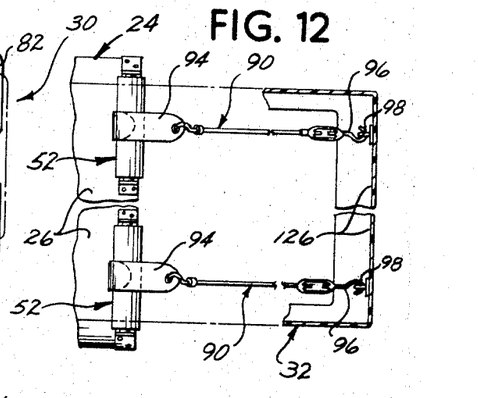
FIG. 12 is an enlarged fragmentary view, with the central portions broken away for drawing space-saving reasons, taken substantially along the plane and in the direction indicated by the arrows 12—12 of FIG. 6 and is primarily for the purpose of illustrating the structure and operation of the flexible restraining and travel-limiting cable means shown in operation primarily in FIGS. 5, 6, and 6A in a boat loading sequence of steps and in FIG. 10 in a boat unloading sequence of steps.

The invention also includes restraining and travel-limiting cable means, one form of which is generally designated by the reference numeral 90 as best shown in FIGS. 1, 4, and 12, where it is shown as comprising a pair of cables 92 having upper hook means 94 adapted to be placed over the rear roller means 52 in the manner best shown in FIGS. 1, 4 and 12, and each having a lower fastening hook 96 adapted to be engaged with respect to corresponding fastening eye or ring means 98 carried within the inside of the rear end of the boat 32 when the boat 32 reaches the FIG. 4 position during a boat-loading operation and adapted to be similarly so engaged during a boat unloading operation when it reaches the position shown in FIG. 6A or FIG. 6.

It will be noted that the function of the travel-limiting cable means 90 is to cause the movement of the boat during a boat loading operation through the sequence of steps shown in FIGS. 5, 6, and 6A to be substantially entirely pivotal around an effective horizontal pivot axis coincident with the axis of the rear pair of roller means 52 so that the position shown in FIG. 6A will be achieved at the end of said pivotal movement, after which the remainder of the movement occurring during the loading operation will be forward or translatory movement and, therefore, prior to said forward or translatory movement, during a boat-loading operation, the travel-limiting cable means 90 is normally disengaged and removed.

On the other hand, the operation of the travel-limiting cable means 90 during a boat unloading operation is substantially the reverse of that just described. It is normally engaged when the boat is in a position similar to that shown in FIG. 6A during a boat unloading operation and thereafter as the winch means 28 is operated in a clockwise extension direction, the boat 32 first pivots into a position similar to that shown in FIG. 6 after which it pivots into a position similar to that shown in FIG. 5, and during this operation no downward slidable movement of the boat occurs because of the restraining and travel-limiting action of the travel-limiting cable means 90.

At this point in a boat unloading operation, the effective horizontal hinge means, generally designated by the reference numeral 100, comes into play and provides for the remainder of the downward and outward pivotal movement of the boat 32 during the succeeding portion of a boat-unloading operation from a position similar to that shown in FIG. 5, followed by the next subsequent position similar to that shown in FIG. 4, into the final position shown in FIG. 2. This, of course, occurs under the control of the winch means 28 and the winch cable 38 engaged over the upper pulley sheave 70 of the just-mounted boom means 68 in the manner previously described. The mounting of the removable, effective horizontal hinge means 100 normally occurs while the boat 32 is in a position similar to that shown in FIG. 5 during a boat unloading operation.

Of course, during a boat landing operation the effective hinge means 100 is mounted at the beginning of the boat loading operation when the apparatus and the boat are in positions such as shown in FIG. 2.

The effective horizontal hinge means 100 referred to above includes first and second effective hinge portions hingedly interconnected and provided with attachment means for controllably removably but firmly attaching said first effective hinge portion in a horizontal, transversely directed position immediately adjacent to and slightly rearwardly spaced from a lower rear end portion of the vehicle 20.

The effective horizontal hinge means is also provided with attachment means for removably attaching the second effective hinge portion referred to above with respect to a rear end portion of the boat 32.

Figure 13:
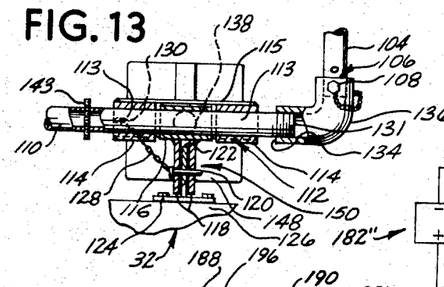
FIG. 13 is an enlarged fragmentary sectional view taken substantially along the plane and in the direction indicated by the arrows 13—13 of FIG. 1 and is primarily for the purpose of illustrating the detailed structure of a right-hand portion of the effective horizontal hinge means—it being understood that the left-hand portion is of similar construction, although positionally reversed.

In the exemplary form of the invention illustrated, the first effective hinge portion referred to above is generally designated by the reference numeral 102 and comprises a pair of longitudinal side members 104 provided with laterally apertured telescopic engagement portions 106 having locking pin means 108 for locking same together in an easily disassembled manner and effectively connecting the longitudinal side member 104 to side ends of the transverse horizontal axis or hinge member portion 110 which has a rotatable sleeve (or mounting) means, such as is generally designated by the reference numeral 112 mounted on corresponding sleeve-mounting portions 113 of each end of the axis or hinge member portion 110 which usually comprises a hollow pipe. Each of the sleeve means 112 mounted on each end of the transverse, horizontal axis or hinge member portion 110 comprises a pair of laterally spaced mounting sleeve portions 114 connected by an offset longitudinal connecting member 115 which may be welded thereto or otherwise connected thereto, and which merely connects said sleeve portions along similar sides thereof and does not, in effect, itself comprise an encircling structure enclosing the central region between the two sleeve portions 114 but rather leaves said central region between said two sleeve portions 114 sufficiently open to allow the insertion into a position therebetween of a rotatable sleeve or journal 116 which is held in aligned but rotatable relationship between the pair of longitudinally spaced mounting sleeve portions 114 by reason of the extension through the centers of all three of said sleeves of the corresponding end of the transverse horizontal axis or hinge member 110 in a manner such that the two sleeve-mounting portions 113 thereof mount the sleeve portions 114 and such that a central rotatable bearing portion of the axis 110, which is designated by the reference numeral 117, rotatably mounts the rotatable sleeve or journal 116 thereon. The rotatable journal or sleeve 116 is provided with a pair of rearwardly projecting, laterally spaced, and laterally apertured tongue portions 118 which are adapted to transversely receive a locking pin 120 therethrough when a forwardly projecting transversely apertured single tongue portion 122, which is rigidly fastened by a fastening bracket 124 to the rear end wall 126 of the boat 32, is placed therebetween in a manner such as is best shown in FIG. 1 and FIG. 13. It should be noted that the locking or coupling pin 120 may be fastened by a chain, spring, or cable 128 to the attachment point 130 so that it will not be lost.

The extreme outermost end 131 of the tubular, transverse member 110 is threaded and threadedly rigidly mounts a corresponding threaded portion of the right-angle elbow 136 which at its rear end provides and defines the previously mentioned engagement means 106 for engagement with the corresponding one of the pair of longitudinal side members 104 as previously mentioned.

The connecting member 115 is shown as being provided with and rigidly connected to a downwardly directed, interiorly threaded sleeve portion 138 which is adapted to threadedly receive the upper end of an exteriorly threaded jack shaft 140 therein and to be fastened thereto by means of a lateral aperture 142 and a retaining pin 144 passed therethrough.

In the example illustrated, each of the two complete mounting sleeve means generally designated at 112 is slidably mounted on the corresponding ends of the main horizontal hinge axis member 110 and is free to rotate with respect to the main hinge axis member 110 and is also free to longitudinally slidably move with respect thereto between the limits determined by the threaded inner end portion 134 of the corresponding elbow 136 and an inner stop screw or projection 143 carried by the main horizontal hinge axis member 110 in an appropriate location. This rotatable and slidable arrangement is advantageous because it makes it possible to rotatably adjust and laterally slidably adjust the position of each of the sleeve means 112 for appropriate hinged cooperation of the complete hinge means 100 with respect to the single tongue portions 122, even if different lateral spacing exists between two such single tongue members 122 carried by a rear end wall 126 of a boat 32. This might be the case with different boats or boats of different size. However, the rotative mounting of each of the mounting sleeve means 112 is primarily to facilitate the quick downward rotation of the interiorly threaded jack sleeve portion 138 and the exteriorly threaded jack shaft 140 pinned thereto by the retaining pin 144 into an appropriate underlying jacking relationship with respect to an interiorly threaded jack sleeve or housing 146 which is rigidly provided with a horizontal platform or base member 148 at the bottom thereof. The exteriorly threaded jack shaft 140 and the interiorly threaded jack sleeve or housing 146 may be threadedly extended or retracted upwardly and downwardly whereby to correspondingly raise or lower the horizontal axis member 110 of the effective horizontal hinge means generally designated at 100, whereby to provide the proper ground clearance to allow boats of various different rear vertical heights to be properly loaded and unloaded.

It should be noted that the pair of laterally spaced and laterally apertured tongue members 118 and the forwardly directed tongue member 122, the attachment bracket 124, and the locking pin 120 may be generally said to comprise coupling means 151 for removably attaching the second effective hinge portion, which is generally designated by the reference numeral 150, to the rear end 126 of the boat 32.

Similarly, the attachment means generally designated by the reference numeral 152 is adapted to attach or fasten the first hinge portion 104 to the rear bumper 82 of a vehicle 20. In the example, said attachment means 152 comprises a pair of downwardly directed attachment ears 154 at each side of the bumper 82 adapted to receive a forward end of each of the two longitudinal side members 104 and to be removably locked and attached thereto by transverse locking pin means 156 extending through aligned, lateral apertures therein.

It will be understood that the arrangement is such that the attachment means 152 and the coupling means 151 can be quickly and easily engaged and disengaged so that the entire effective horizontal hinge means 100 can be quickly placed in engaged relationship or can be quickly disengaged and disassembled and stored within the camper body 24 until subsequently needed.

Figure 11:
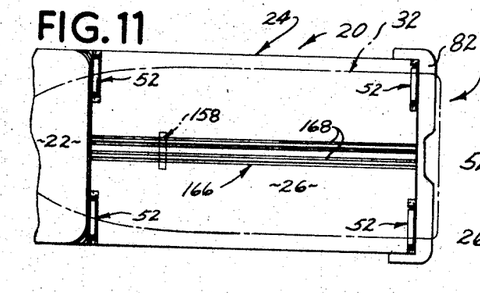

In the exemplary form of the invention illustrated, an additional roller means, generally designated at 158, is carried by bracket means 160 mounted on top of the boat 32 at a location behind the forward top surface portion 162 of the boat and immediately in front of the rear open portion of the boat indicated generally at 164, and is provided primarily for the purpose of centrally supporting and aiding the guiding of the rollable movement of the inverted boat 32 along the top 26 of a vehicle during either the first phase of a boat unloading operation or the final phase of a boat loading operation as previously described. To facilitate this, the part of the top 26 of the vehicle 20 (actually the central part of the top of the camper body 24) is longitudinally provided with what might be termed roller receiving, abutting, and supporting track means, such as is generally designated at 166 in FIGS. 9 and 11 and which, in the example shown comprises a pair of inverted channel members 168 along which the roller means 158 is adapted to roll. It should also be noted that the side portions 170 of the bracket means 160 may be extended, if desired, as shown in phantom so as to laterally encompass the track means 166 and, thus, provide a definite longitudinal guiding action during rolling movement of the inverted boat 32 therealong.

It should be noted that all of the various roller means referred to, such as the four main rollers 52 and the roller means 158 carried by the boat 32, may have a rigid central shaft portion exteriorly provided with a compressible elastomeric outer roller portion which may be rubber, various kinds of compressible, elastomeric plastic material, or various other suitable compressible materials.

Figure 14:
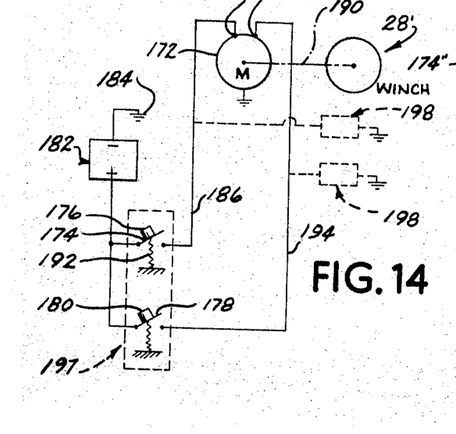
FIG. 14 is a view of a fragmentary, partly diagrammatic, and partly schematic nature illustrating a slight modification of the invention where a winch may be operated from a position at the rear of the camper body so that the entire loading and unloading operation, except for the fastening and unfastening of boat edge clamps, can be accomplished from one position at the rear of the vehicle.

FIG. 14 illustrates in diagrammatic, electrical schematic form, a very slight modification of the invention, and, therefore, the elements thereof which correspond to those of the first form of the invention are designated by similar reference numerals, primed, however. In this modification, the winch means, generally designated by the reference numeral 28', is power-driven by a reversible electric motor 172 so that the winch means 28' can be driven in an extension direction or a retraction direction by corresponding energization of the motor 172 for rotation in either a counterclockwise, retraction direction or a clockwise, extension direction. This is accomplished by operating either the retraction switch 174 by pressing the pushbutton 176 or by operating the extension switch 178 by pressing the pushbutton 180.

As is apparent from examination of FIG. 14, the vehicle storage battery 182 has its positive terminal connected to one side of the retraction switch 174 and the extension switch 178, and has its other side grounded as indicated at 174. The other side of the retraction switch 174, when temporarily closed by operation of the pushbutton 176, will be connected by the lead 186 to the retraction-movement-producing terminal 188 of the motor 172 and will cause the motor 172 to cause its output shaft, indicated diagrammatically at 190 and the coupled winch 28' to rotate in a counterclockwise or retraction direction until the pushbutton 176 is released and the retraction switch 174 opens under the action of its biasing spring 192.

The operation of the extension switch 178 is substantially the same. In other words, the positive terminal of the vehicle storage battery 182 is connected to the other lead 194 when the extension switch 178 is closed by temporary manual operation of the pushbutton 180, and this connects to the extension terminal 196 of the motor 172 and causes the output shaft 190 of the motor 172 to rotate in the opposite or clockwise extension direction until the pushbutton 180 is released. Of course, this also causes the winch 28' to correspondingly rotate in a clockwise extension direction for the same period of time.

Since the entire switch box 197 is usually located at the rear end of the vehicle, such as shown at 30 in the first form of the invention, this makes it possible for an operator to stand at the rear of the vehicle and operate the winch 28' during either a boat-loading or unloading operation, thus eliminating the necessity of walking to the front of the vehicle for manual operation of the winch.

The motor 172 may be of a dynamically braked type which is positively locked or braked whenever de-energized so as to firmly correspondingly lock the winch means 28' whenever the motor 172 is de-energized. This is one way of providing for locking of the winch. However, another way is to provide in the coupling shaft, indicated diagrammatically at 190 in FIG. 14, a one-way type of gearing which only allows power to be transmitted therethrough in one direction such as worm and worm wheel means, or any substantial functional equivalent. This will, of course, lock the winch means 28' in whatever position it is in when the motor 172 becomes de-energized. Also, the winch means 28' may itself be provided with winch locking means such as brake means, locking pin or clutch means, or the like, of any of the several types well known in the art, and may be arranged to be temporarily moved out of the locked relationship thereof into unlocked relationship thereof whenever the motor 172 is electrically energized, by reason of the simultaneous energization of corresponding solenoid or other type of unlocking, electrically energizable movement-producing means such as indicated in broken lines at 198 in FIG. 14. In other words, various types of automatic winch locking and unlocking means may be employed within the broad scope of the invention.

Figure 15:
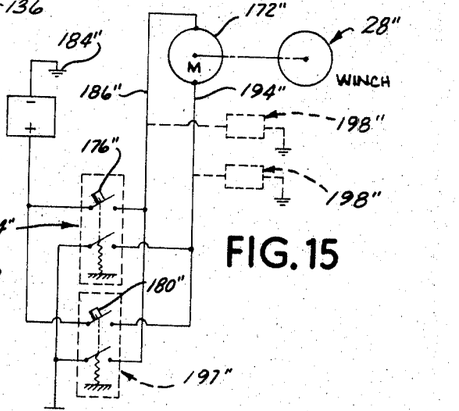
FIG. 15 is a view very similar to FIG. 14 but illustrates a very slight modification thereof wherein a different type of winch-driving motor is employed and, consequently, the control circuitry and switching is correspondingly modified.

FIG. 15 is a view very similar to FIG. 14, but illustrates a slight modification thereof wherein a different type of winch-driving motor is employed. Because it is a modification, parts corresponding to those of FIG. 14 are designated by similar reference numerals, doubly primed, however. In the arrangement illustrated in FIG. 15, each of the two leads 186" and 194" is adapted to be connected in a completely positionally reversed manner relative to the storage battery means 182" when the retraction switch means, indicated generally at 174", is moved into closed relationship by the pushbutton 176", and when the opposite extension connection is made by temporary closure of the extension switch means, indicated generally at 178", by operation of the pushbutton 180". This arrangement is provided merely to accommodate a different type of winch motor 172", which is effectively reversed by reversing the polarity of the two terminals rather than by the type of alternate connection shown in the FIG. 14 form of reversible motor 172. Otherwise, this modification of the invention is functionally similar to that described in connection with the FIG. 14 form of the invention, and no further detailed description thereof is thought necessary or desirable.

It should be noted that the winch means may be power-driven by various types of motors or power sources other than the two different types of electric motors illustrated in fragmentary diagrammatic electrical schematic form, in one version in FIG. 14 and in another version in FIG. 15. For example, a power take-off driven from the pick-up truck engine may be employed and may be of either a mechanical or hydraulic type. Additionally, it should be noted that the winch-driving motor may be of any suitable fluid motor type adapted to be driven by pressurized fluid which may be supplied from a conventional fluid pressurizing system of the truck of the type employed for power steering systems, power braking systems, or the like. Such fluid motor means may be of any conventional rotary type well known in the art or may be of a translatory-movement type such as a double-action actuator cylinder, or the like, coupled by linear-to-rotary movement converter and power-transmission means to the winch. Indeed, virtually any type of motor may be employed for powering the winch means, and all such arrangements are intended to be included and comprehended within the broad scope of the present invention. This is also true of various control means for such motors, either as to direction or as to the speed of operation thereof.

It should be understood that the figures, and the specific description thereof set forth in this application, are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Boat loading and unloading apparatus for a vehicle, comprisnig: at least two pairs of laterally spaced, horizontally transversely axially directed roller means adapted to be rotatably mounted above the top of a vehicle for rotating movement in a fore-and-aft direction with respect to a vehicle top and adapted to rollably support inverted, longitudinal side edges of an inverted boat whereby to allow same to be longitudinally rolled from one end of a vehicle toward an opposite end thereof and vice versa; controllably operable and controllably lockable winch means provided with a longitudinal winch cable means having a free end controllably extendable and retractable with respect thereto; winch attachment and mounting means for firmly and rigidly mounting said winch means at one end of a vehicle; said free end of said winch cable means being provided with coupling means cooperable for attachment to one end of a boat when located in either a fully loaded inverted position or a fully unloaded non-inverted position longitudinally extended from one end of a vehicle and at a horizontal level substantially adjacent to a bottom level of the vehicle; controllably mountable and dismountable upwardly extending boom means provided with rollable pulley sheave wheel means adjacent to the top thereof positioned for rolling movement around a transversely horizontally directed axis and effectively comprising an upper positioning and force-applying means supportingly cooperable with respect to an extended portion of said longitudinal winch cable means behind said free end thereof when said extended portion of said winch cable is passed over said pulley sheave wheel means and said coupling means is attached to one end of a boat and boat-weight-lifting retraction or boat-weight-lowering extension movement of said winch cable means is effected by said winch means during a boat loading or unloading operation, respectively; boom attachment and mounting means for firmly and rigidly mounting said boom means in said upwardly extending relationship adjacent to an opposite end of a vehicle from said winch attachment and mounting means; effective horizontal hinge means including first and second effective hinge means portions hingedly interconnected for effective relative rotation around a horizontal transversely directed axis and provided with attachment means for firmly attaching said first effective hinge means portion in a horizontal, transversely directed position immediately adjacent to a corresponding lower longitudinal end portion of a vehicle and provided with attachment coupling means for removably attaching said second effective hinge portion with respect to one end portion of a boat prior to the beginning of boat-weight-lifting retraction or boat-weight-lowering extension movement of said winch cable means by said winch means during a boat loading or unloading operation, respectively; and restraining and travel-limiting longitudinal means provided with means for attaching one end of same to one end of a boat and provided with means for attaching an opposite end thereof with respect to a fixed upper attachment location at one end of a vehicle top prior to the occurrence of an arcuate repositioning movement of a boat inner pivot end during a corresponding portion of a boat loading or unloading operation for limiting the lowermost position of a boat inner pivot end attained adjacent to a loading and unloading end of a vehicle to a predetermined minimum elevation above an underlying ground level.

2. Apparatus as defined in claim 1, wherein said restraining and travel-limiting means is adapted to be attached by said attaching means to an attachment end of a boat comprising the same end thereof adapted to be attached to said first effective hinge means portion of said horizontal hinge means by said attachment means thereof whereby to cause the attachment end of the boat to effectively comprise the inner pivot end of the boat also and to cause said restraining and travel-limiting means to provide and allow only downward and inward arcuate repositioning movement of the attachment and inner pivot end of the boat during the intermediate arcuate repositioning unloading movement portion of a boat unloading operation and to allow only the oppositely directed upward and outward arcuate repositioning movement of the attachment and inner pivot end of the boat during an intermediate arcuate repositioning loading movement portion of a boat loading operation to occur under the controlling influence and force applied to the opposite end of the boat by the free end of said winch cable means controlled by said winch means.

3. Apparatus as defined in claim 1, wherein said winch attachment and mounting means is of a controllably engageable and disengageable nature firmly but controllably removably mounting said winch means is an upwardly extending relationship at a front end of a vehicle.

4. Apparatus as defined in claim 1, wherein said boom attachment and mounting means is of a controllably engageable and disengageable nature firmly but controllably removably mounting said boom means in an upwardly extending and a collapsible relationship at a rear end of a motor vehicle in a manner extending substantially above a vehicle top thereof.

5. Apparatus as defined in claim 1, wherein said winch attachment and mounting means is of a controllably engageable and disengageable nature firmly but controllably removably mounting said winch means is an upwardly extending relationship at a front end of a vehicle and wherein said boom attachment and mounting means is of a controllably engageable and disengageable nature firmly but controllably removably mounting said boom means in an upwardly extending and a collapsible relationship at a rear end of a motor vehicle in a manner extending substantially above a vehicle top thereof.

6. Apparatus as defined in claim 1, wherein said winch means is provided with controllably operable power-driving means and control means for initiating and controlling the operation thereof from at least one conveniently accessible control location.

7. Apparatus as defined in claim 1, wherein said winch means is provided with controllably operable power-driving means and control means for initiating and controlling the operation thereof from at least one conveniently accessible control location located adjacent to a rear end of a vehicle.

8. Boat loading and unloading apparatus for a vehicle, comprising: at least two pairs of laterally spaced, horizontally transversely axially directed roller means adapted to be rotatably mounted above the top of a vehicle for rotating movement in a fore-and-aft direction with respect to a vehicle top and adapted to rollably support inverted, longitudinal side edges of an inverted boat whereby to allow same to be longitudinally rolled from one end of a vehicle toward an opposite end thereof and vice versa; controllably operable and controllably lockable winch means provided with a longitudinal winch cable means having a free end controllably extendable and retractable with respect thereto; winch attachment and mounting means for firmly and rigidly mounting said winch means at one end of a vehicle; said free end of said winch cable means being provided with coupling means cooperable for attachment to one end of a boat when located in either a fully loaded inverted position or a fully unloaded non-inverted position longitudinally extended from one end of a vehicle and at a horizontal level substantially adjacent to a bottom level of the vehicle; controllably mountable and dismountable upwardly extending boom means provided with rollable pulley sheave wheel means adjacent to the top thereof positioned for rolling movement around a transversely horizontally directed axis and effectively comprising an upper positioning and force-applying means supportingly cooperable with respect to an extended portion of said longitudinal winch cable means behind said free end thereof when said extended portion of said winch cable is passed over said pulley sheave wheel means and said coupling means is attached to one end of a boat and boat-weight-lifting retraction or boat-weight-lowering extension movement of said winch cable means is effected by said winch means during a boat loading or unloading operation, respectively; boom attachment and mounting means for firmly and rigidly mounting said boom means in said upwardly extending relationship adjacent to an opposite end of a vehicle from said winch attachment and mounting means; effective horizontal hinge means including first and second effective hinge means portions hingedly interconnected for effective relative rotation around a horizontal transversely directed axis and provided with attachment means for firmly attaching said first effective hinge means portion in a horizontal, transversely directed position immediately adjacent to a corresponding lower longitudinal end portion of a vehicle and provided with attachment coupling means for removably attaching said second effective hinge portion with respect to one end portion of a boat prior to the beginning of boat-weight-lifting retraction or boat-weight-lowering extension movement of said winch cable means by said winch means during a boat loading or unloading operation, respectively; and flexible restraining and travel-limiting cable means provided with means for attaching one end of same to a rear end of a boat and provided with means for attaching an opposite end thereof with respect to a fixed upper attachment location at a rear end of a vehicle top prior to the occurrence of an arcuate repositioning movement of the rear end of the boat during a corresponding portion of a boat loading or unloading operation for limiting the lowermost position of the rear end of the boat attained adjacent to a rear loading and unloading end of a vehicle to a predetermined minimum elevation above an underlying ground level.

9. Apparatus as defined in claim 8, wherein said winch attachment and mounting means is of a controllably engageable and disengageable nature firmly but controllably removably mounting said winch means in an upwardly extending relationship at a front end of a vehicle.

10. Apparatus as defined in claim 8, wherein said boom attachment and mounting means is of a controllably engageable and disengageable nature firmly but controllably removably mounting said boom means in an upwardly extending and a collapsible relationship at a rear end of a motor vehicle in a manner extending substantially above a vehicle top thereof.

11. Apparatus as defined in claim 8, wherein said winch attachment and mounting means is of a controllably engageable and disengageable nature firmly but controllably removably mounting said winch means in an upwardly extending relationship at a front end of a vehicle, and wherein said boom attachment and mounting means is of a controllably engageable and disengageable nature firmly but controllably removably mounting said boom means in an upwardly extending and a collapsible relationship at a rear end of a motor vehicle in a manner extending substantially above a vehicle top thereof.

References Cited

UNITED STATES PATENTS

| 2,584,163 | 2/1952 | Squires | 214—450 |
| 2,896,804 | 7/1959 | Ingram | 214—450 |
| 2,967,635 | 1/1961 | Barnett | 214—450 |
| 3,045,849 | 7/1962 | Tweten | 214—450 |

HUGO O. SCHULZ, *Primary Examiner.*